US010220780B2

(12) United States Patent
Bengtsson

(10) Patent No.: US 10,220,780 B2
(45) Date of Patent: Mar. 5, 2019

(54) LIGHTING MODULE FOR VEHICLE

(71) Applicant: VOLVO CAR CORPORATION, Gothenburg (SE)

(72) Inventor: Christopher Bengtsson, Kungsbacka (SE)

(73) Assignee: VOLVO CAR CORPORATION, Gothenburg (SE)

(*) Notice: Subject to any disclaimer, the term of this patent is extended or adjusted under 35 U.S.C. 154(b) by 0 days.

(21) Appl. No.: 15/960,741

(22) Filed: Apr. 24, 2018

(65) Prior Publication Data

US 2018/0319335 A1    Nov. 8, 2018

(30) Foreign Application Priority Data

May 4, 2017 (EP) .................................... 17169411

(51) Int. Cl.
*B60Q 11/00* (2006.01)
*B60Q 1/00* (2006.01)
*B60Q 1/04* (2006.01)
*B60Q 1/14* (2006.01)
*B60Q 1/26* (2006.01)

(52) U.S. Cl.
CPC .......... *B60Q 11/005* (2013.01); *B60Q 1/0064* (2013.01); *B60Q 1/0094* (2013.01); *B60Q 1/04* (2013.01); *B60Q 1/1407* (2013.01); *B60Q 1/26* (2013.01)

(58) Field of Classification Search
CPC ...... B60Q 11/005; B60Q 1/0094; B60Q 1/04; B60Q 1/26

USPC .......................................................... 315/82
See application file for complete search history.

(56) References Cited

U.S. PATENT DOCUMENTS

| 2010/0052536 A1* | 3/2010 | Zielinski ............ H05B 33/0857 315/77 |
| 2011/0156588 A1 | 6/2011 | Brant |
| 2018/0022267 A1 | 1/2018 | Hagemeier |

FOREIGN PATENT DOCUMENTS

| DE | 10 2009 060 789 A1 | 6/2011 |
| DE | 10 2015 105 162 A1 | 10/2016 |
| WO | 2014/072783 A2 | 5/2014 |

OTHER PUBLICATIONS

Extended European Search Report dated Nov. 22, 2017, Application No. 17169411.0-1762, Applicant Volvo Car Corporation, 8 Pages.

* cited by examiner

*Primary Examiner* — Daniel D Chang
(74) *Attorney, Agent, or Firm* — Brooks Kushman P.C.

(57) ABSTRACT

The present disclosure relates to a lighting module for a vehicle, the lighting module comprising: a light emitting device; and a control unit configured to control a lighting state of the lighting device, wherein the lighting module is adapted for arrangement in a first location of at least two spatially separated locations of the vehicle; wherein the control unit of the lighting module comprises a connection port, wherein the control unit is configured to receive a voltage status via the connection port, the voltage status being indicative of that the lighting module is configured to be arranged in the first location.

20 Claims, 6 Drawing Sheets

LIGHTING MODULE FOR VEHICLE

CROSS-REFERENCE TO RELATED APPLICATIONS

This application claims foreign priority benefits under 35 U.S.C. § 119(a)-(d) to European patent application number EP 17169411.0, filed May 4, 2017, which is incorporated by reference in its entirety.

TECHNICAL FIELD

The present disclosure relates to a lighting module for a vehicle, to a system of lighting modules and to a vehicle comprising such lighting module.

BACKGROUND

The electrical systems of vehicles are becoming relatively complex and may comprise a large number of electrical control units (ECUs) for controlling various functions of the vehicle. For example, ECUs may control suspension systems, power train electronics, battery management in case of electrical vehicle, speed control, etc. It is of importance that each ECU has knowledge of its function and sometimes also location in the vehicle.

Some parts of a vehicle may comprise generic components but should be mounted in specific locations. One such part is head lights or tail lights for the vehicle which apart from the design in principle may be functional in more than one location. However, for properly functioning of communication from circuitry of each of the head lights or tail lights with the other parts of the electrical system of the vehicle in relation to their function, it is important for the circuitry of the head lights or tail lights to gain information of its mounting location. For example, the wrong mounting location for parts of the head light or tail light may cause the right side head light to operate as a left side head light.

In addition, it is of interest to be able to use as many generic components in the headlamp module as possible in order to reduce cost and workload in assembly of the head light or tail light module.

Therefore, there is a need for a simple yet reliable way for ensuring correct communication paths from a vehicle lighting module associated with its mounting location, with other parts of the vehicle electrical system.

SUMMARY

In view of above, it is an object of the present disclosure to provide a lighting module for a vehicle with improved means for ensuring correct communication path and thus functioning for a generic control unit arranged in a specific location.

According to a first aspect of the disclosure, there is provided a lighting module for a vehicle, the lighting module comprising: a light emitting device, and a control unit configured to control a lighting state of the lighting device, wherein the lighting module is adapted for arrangement in a first location of at least two spatially separated locations of the vehicle; wherein the control unit of the lighting module comprises a connection port, wherein the control unit is configured to receive a voltage status via the connection port, the voltage status being indicative of that the first lighting module is configured to be arranged in the first location.

The present disclosure is based on the realization that generic control units (e.g., electrical control units (ECUs)) for lighting modules for a vehicle need to somehow receive information regarding in which location of the vehicle they are intended to be mounted, e.g., if they are to be mounted as a right head/tail light module or as a left head/tail light module. It was realized that by utilizing a reserved connection port of the control unit, a voltage status received at the connection port may provide an indication of the intended mounting location of the lighting module. The voltage status may preferably be a passive voltage status, in other words, there is not sent information via the voltage status, rather, depending on the voltage status (i.e., voltage level, a voltage or no voltage, etc.), the control unit gains knowledge of its intended mounting location by matching the voltage status with stored voltage statuses which each has associated mounting locations. A simple way of matching would be to have the voltage status and associated mounting locations in a look-up table stored on the control unit and match the received voltage status with the voltage statuses in the look-up table.

A light-emitting device may for example be a halogen light emitting device, a light-emitting diode (LED), or any other suitable light emitting device for vehicle exterior lights.

The lighting module may also comprise a housing for housing at least the light-emitting device (or light-emitting devices), and suitable circuitry for connecting the control unit with the light-emitting device or other parts of the vehicle.

The control unit is preferably a generic electrical control unit (ECU). The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Accordingly, the disclosure provides the advantages that generic control units may be arranged in any location suitable for the lighting module application, whereby the control unit receives information of the intended mounting location when it is mounted in the lighting module. Thereby, the control unit does not have to be specifically adapted for a specific location.

According to one embodiment, the control unit may comprise a storage device, wherein the control unit may be pre-configured for use in any one of the at least two locations of the vehicle before the vehicle has stored a value indicative of an intended mounting location in the vehicle, wherein the control unit is configured to receive a value indicative of the mounting location, whereby the control unit is configured to store the value indicative of the mounting location in the storage device such that the control unit is operable in the mounting location.

The control unit is thus prepared for installation in any one of the locations; however, upon installation the control unit receives a value indicative of a mounting location for the lighting module. The "installation" may be a programming step before mounting in the vehicle.

According to one embodiment, at least one voltage status and associated location value pair may have been stored on the storage device, wherein the control unit is configured to:

determine a value indicative of the first location based on the received voltage status and the stored at least one voltage status and associated location value pair, compare the value indicative of the mounting location with the value indicative of the first location, wherein when the first location is determined to not match the mounting location, the control unit is configured to provide an alert signal that the control unit is installed in the wrong location.

Hereby, the control unit ensures that if it has been programmed for operation in the wrong location, i.e., in a lighting module configured for operation in a location not matching with the first location, an alert is provided.

In contrast if the two locations do match, the control unit may be ensured that it has been programmed for operation in the correct location.

Accordingly, the control unit may advantageously comprise a storage device having stored a look-up table comprising a plurality of voltage status and associate location pairs. For example, one pair may be ground-left, and another may be open circuit-right.

When the control unit is transitioned from an at least partly in-active mode to an at least partly active mode, the control unit may receive a further voltage status indicative of the present location where the control unit is installed, wherein the control unit is configured to: compare the present location with the mounting location, and when the present location does not match the mounting location, provide an alert signal that the control unit is installed in the wrong location.

Thus, after having received a value indicative of a mounting location which matches the first location, the control unit has stored information that it should be operable in the programmed mounting location, i.e., the control unit is programmed to remain mounted in that mounting location. Each time the control unit is powered on, it again checks that the received voltage status is in agreement with the previously determined mounting location. If the location indicated by the voltage status is not in agreement with the mounting location, an alert signal is provided. The alert signal may be provided by a sound, a warning light on the dashboard, by an error code, or any other suitable means.

It should be noted that the mounting location does not have to be in the same vehicle as long as the corresponding mounting locations match. For example, in case the control unit is used as a spare part, and is mounted in a second mounting location being different from the first mounting location but in a different vehicle, an alert should be provided. For example, the first mounting location may be "left head light" and the second mounting location may be "right headlight" on two different vehicles. Then the received voltage status when installed as the spare part in the second mounting position will not be associated with a mounting location that matches with the initial (first) mounting location. In order to not encounter communication problems, such as the head light acts as the incorrect head light. i.e., the control for the left head light may incorrectly control the right head light due to communication address faults, the control unit provides an alert to the vehicle electrical system that it has been installed in the wrong location. A "head light" and a "tail light" should be interpreted as including the respective directional lights.

As mentioned, the received voltage status may be a passive voltage status. For example, the voltage status received from one of the connection ports may be one of a floating voltage or ground.

According to a second aspect of the disclosure, there is provided a lighting system comprising a lighting module according to any of the above descriptions, wherein the lighting module is a first lighting module and the control unit is a first control unit, the lighting system comprising: a second lighting module comprising a second lighting device: and a second control unit configured to control a lighting state of the second lighting device, wherein the second lighting module is adapted for arrangement in a second location of at least two locations the vehicle; wherein the second control unit comprises a connection port, wherein the second control unit is configured to receive a voltage status from the connection port, the voltage status being indicative of that the second lighting module is configured to be arranged in the second location.

The voltage status received from the first connection port is a one of a floating voltage, ground, or a first reference voltage, and the voltage status received from the second connection port is another one of a floating voltage, ground, or a reference voltage different from the first reference voltage. Hereby, a simple way of distinguishing between first location and second location is provided. In fact, there is highly reduced need for electrical components for distinguishing between the first and second mounting locations. A floating connection is that the connection is not connected to anything at all, i.e., the voltage is undefined. A ground connection may be a ground connection of the vehicle.

The first lighting module and the second module may be tail light modules for the vehicle. Alternatively, the first lighting module and the second module may be head light modules for the vehicle.

The first lighting module and the second lighting module may each comprises a main connection port such that the first control unit and the second control unit can communicate with electronic circuitry of the vehicle. Thus, the main connection port provides the communication capabilities to the vehicle electrical system such that the lighting modules may each be controllable by an operator of the vehicle. A main connection port may provide communication capabilities for the respective control unit with the electrical system of the vehicle via a CAN bus known per se to the skilled addressee.

This second aspect of the disclosure provides similar advantages as discussed above in relation to the previous aspect of the disclosure.

There is further provided a vehicle comprising the lighting system according to embodiments of the second aspect.

According to a third aspect of the disclosure, there is provided a method for configuring a lighting module for operating in a first location of at least two spatially separated locations of a vehicle, the lighting module comprising a light-emitting device; and a control unit configured to control a lighting state of the lighting device; wherein the control unit comprises a connection port, wherein the method comprises: receiving, by the control unit, a value indicative of a mounting location for the lighting module; receiving, by the control unit, a voltage status via the connection port, the voltage status being indicative of that the lighting module is configured to be arranged in the first location, and comparing, by the control unit, the mounting location with the first location, wherein when the mounting location and the first location are determined to not match, providing an alert signal that the control unit is installed in the wrong location.

According to embodiments of the disclosure, when the control unit is transitioned from an at least partly in-active mode to an at least partly active mode and the control unit has stored a value indicative of the mounting location, receiving, by the control unit, a further voltage status indicative of the present location where the control unit is installed, compare, by the control unit, the present location with the mounting location, and when the present location does not match the mounting location, provide an alert signal that the control unit is installed in the wrong location.

In yet another embodiment, when the lighting module is mounted in the first location in a vehicle, and having received a voltage status indicative of the first location: initiating communication, by the control unit, with a node address within electronic circuitry of the vehicle, the node address is associated with the first location.

This third aspect of the disclosure provides similar advantages as discussed above in relation to the previous aspects of the disclosure.

In summary, the present disclosure relates to a lighting module for a vehicle, the lighting module comprising: a light emitting device; and a control unit configured to control a lighting state of the lighting device, wherein the lighting module is adapted for arrangement in a first location of at least two spatially separated locations of the vehicle; wherein the control unit of the lighting module comprises a connection port, wherein the control unit is configured to receive a voltage status via the connection port, the voltage status being indicative of that the first lighting module is configured to be arranged in the first location.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings showing example embodiments.

DETAILED DESCRIPTION

Figure 1:
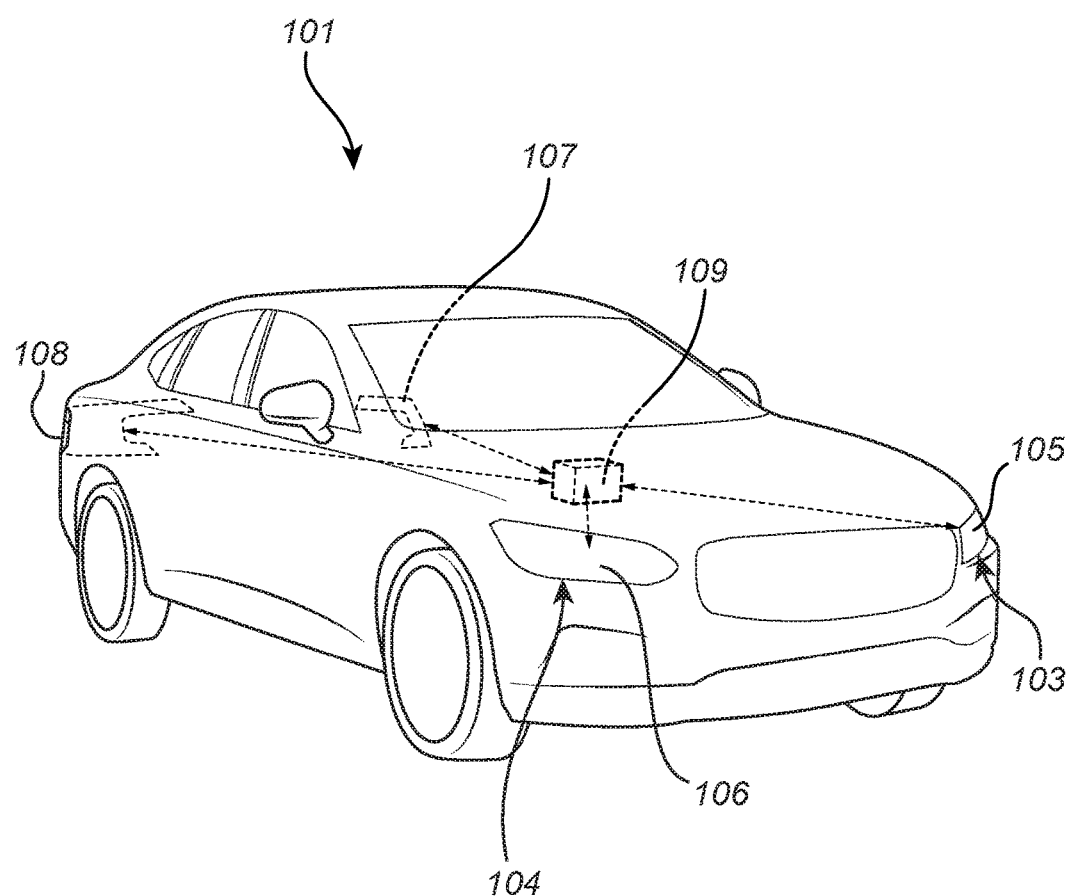
FIG. 1 schematically illustrates a vehicle comprising a lighting system.

In the present detailed description, various embodiments of the system and method according to the present disclosure are mainly described with reference to the head light modules of a vehicle in the form of a car. However, the present disclosure may equally be used for any other type of vehicle such as e.g., a bus, a truck, etc. Furthermore, the disclosure is equally applicable to the tail light modules of a vehicle. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1 shows a vehicle in the form of a car 101. The car 101 comprises a first lighting module arranged as a left head light module 103 and a second lighting module arranged as a right head light module 104. The mounting locations may generally be left 105 or right 106 head light locations or left 107 or right 108 tail light locations. The lighting modules 103 and 104 are in communication with a vehicle electrical system 109, whereby an operator of the vehicle may control the lighting state of the lighting modules 103, 104. For example, such lighting state may be to turn the direction lights on or off, or control the high-beam/low-beam state of the main lights. Thus, each of the lighting modules comprises at least one lighting device (not shown) such as a lighting-emitting diode or a halogen light source.

In order for properly functioning communication between the lighting modules 103, 104 and the electrical system 105, it is important that the control units (not shown in FIG. 1) of the lighting modules communicate with the correct address in the electrical system 105. In other words, the control unit of first lighting module 103 must communicate with the node address of the electrical system 105 corresponding to the left head light module 103, and the control unit of second lighting module 104 must communicate with the node address of the electrical system 105 corresponding to the right head light module 104.

Figure 2:
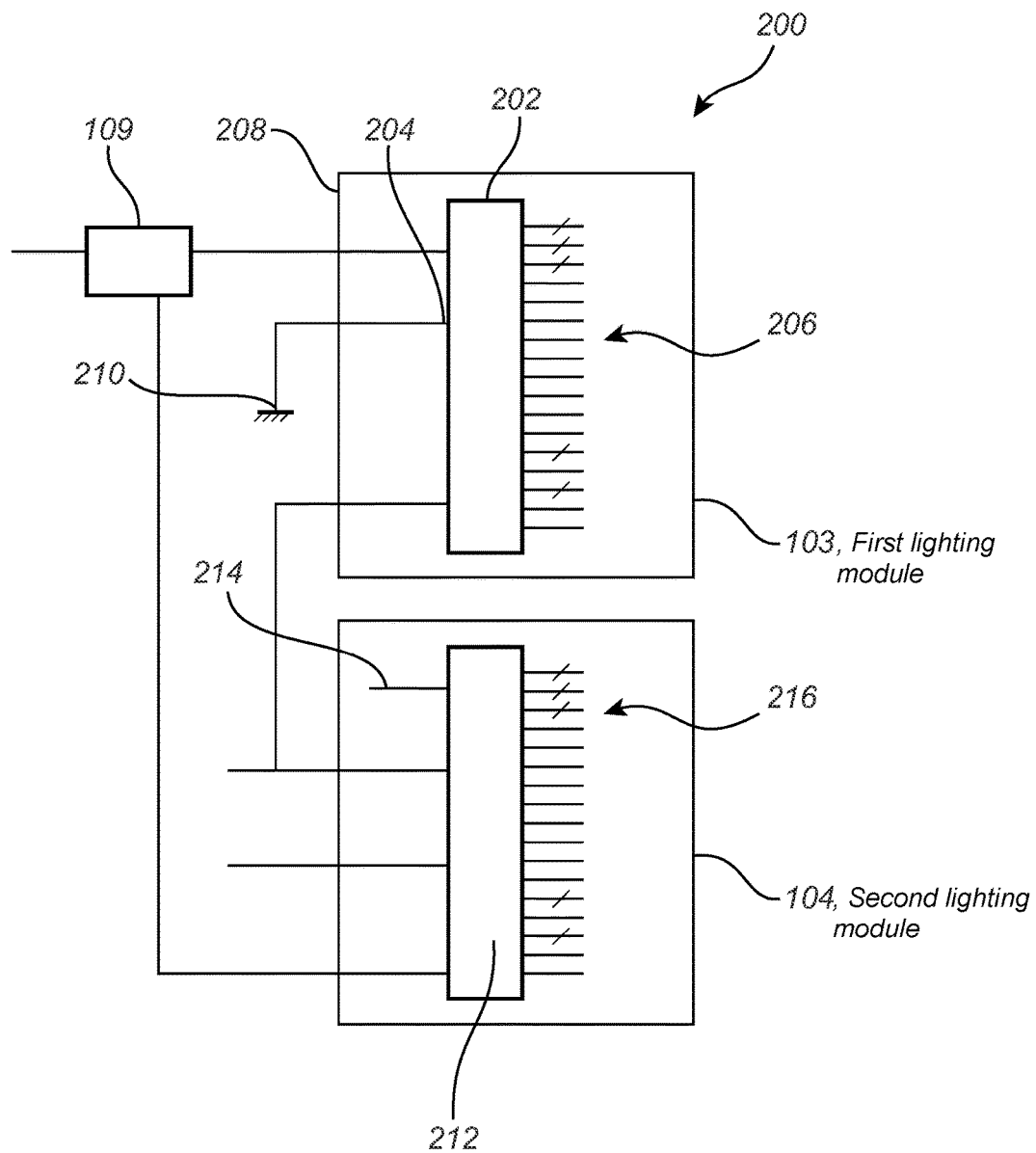
FIG. 2 is a schematic view of a first lighting module and a second lighting module.

FIG. 2 schematically illustrates a first lighting module 103 and a second lighting module 104 in a lighting system 200 for a vehicle. The first lighting module 103 comprises a first control unit 202 which is configured to control a lighting state of a lighting-emitting device (not shown) of the first lighting module. The lighting emitting device(s) is/are electrically connected to the output ports 206 on the control unit 202. The control unit 202 comprises a connection port 204 in the form of a connection pin 204. The connection port is configured to receive a voltage status, which is provided to the control unit 202 via the connection pin 204. In this presently illustrated embodiment, the connection pin 204 in connected to a ground connection 210. The control unit 202 is configured to receive the voltage status, i.e., in this case a ground status, and based on the ground status, the control unit 202 may in this presently illustrated embodiment determine that it is configured to be arranged in a left head lamp lighting module.

Similarly, the second lighting module 104 comprises a second control unit 212, which is configured to control a lighting state of a lighting-emitting device (not shown) of the second lighting module. The lighting emitting device(s) is/are electrically connected to the output ports 216 on the control unit 212. The control unit 212 comprises a connection port 214 in the form of a connection pin 214. The connection port 214 is configured to receive a voltage status which is provided to the control unit 212. In this presently illustrated embodiment, the connection pin 214 in not connected to a connection point, but is instead a floating connection. The control unit 202 is configured to receive the voltage status, i.e., in this case of a floating voltage (i.e., the voltage is undefined due to the high impedance input provided by the floating connection), and based on the floating connection status, the control unit 212 may determine that it is configured to be arranged in a right head lamp lighting module, in this presently illustrated embodiment.

It should be understood that it is predetermined that a voltage status is associated with a specific mounting location. In this presently illustrated exemplary embodiment, the ground connection voltage status is associated with a left head light mounting location and the floating connection voltage status is associated with a left head light mounting location. Each of the control units may comprise a storage device (not shown) which has stored thereon a look-up table of voltage statuses and associated locations such that the control unit may read a voltage status and then via the look up table determine e.g., if it is mounted in a left or right head (tail) light module.

Figure 3A:
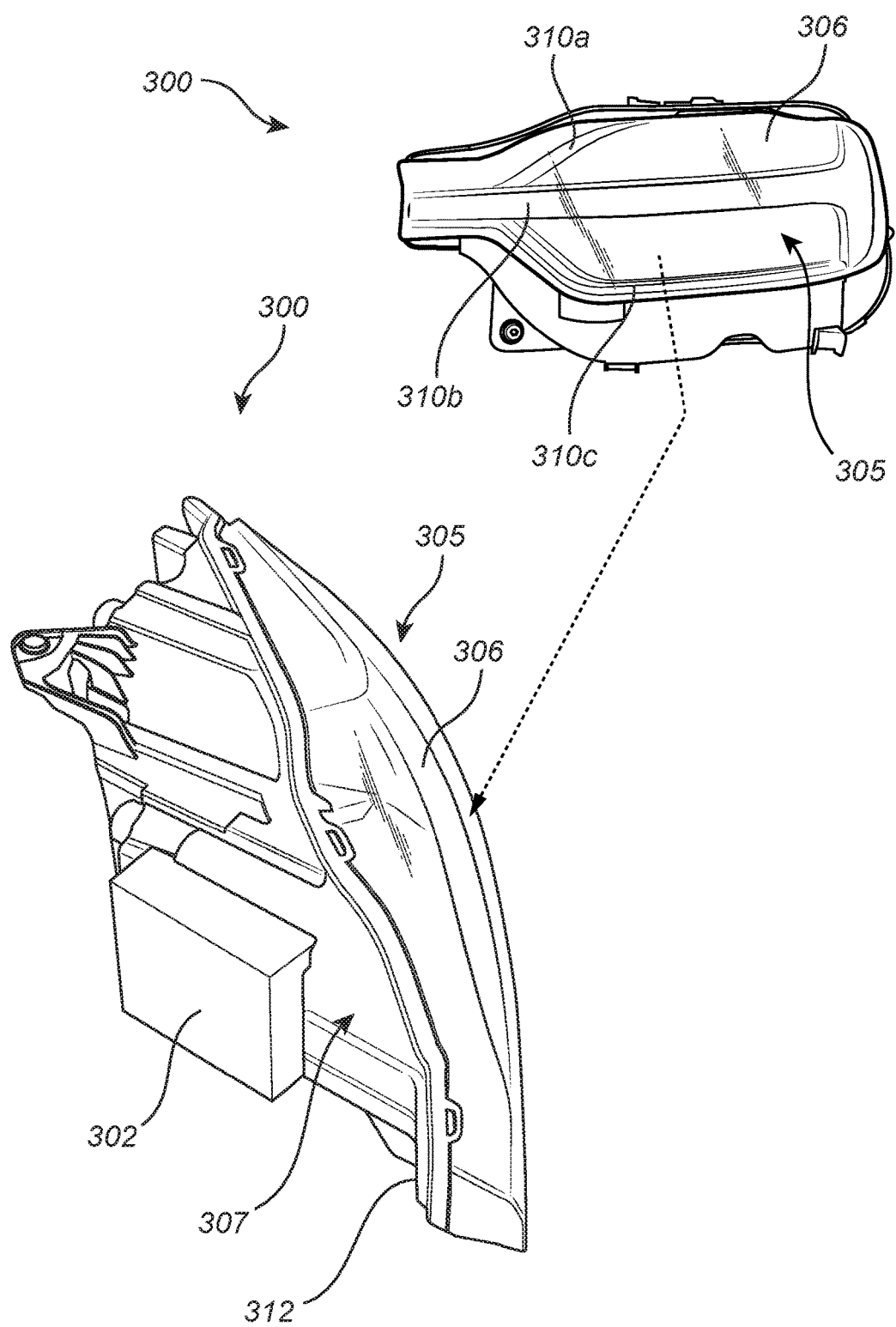
FIG. 3A conceptually illustrates lighting module according to embodiments of the disclosure.

FIG. 3A conceptually illustrates a lighting module 300 according to embodiments of the disclosure. The lighting module 300 may be adapted for mounting in a specific mounting location, in this presently illustrated embodiment the lighting module is a left side head light module. The lighting module 300 comprises a housing 305 including an at least semitransparent cover 306 and a rear assembly part 307 which may be matched together with the cover 306 to form the housing 305. The cover 306 is sufficiently transparent to provide light through the cover to illuminate a road ahead of the vehicle. Such covers are known per se in the art.

The rear part 307 is adapted to support light-emitting devices 310a-c such as a high beam light-emitting device 310a, low-beam light-emitting device 310b, and a directional light-emitting device 310c. The light emitting devices 310a-c are electrically connected with a control unit 302 via internal wiring (not shown). The control unit 302 is also mounted on the rear part 307. Furthermore, the lighting module 300 comprises a main connection port 312, which provides a connection for the control unit 302 to an electrical system of the vehicle where the lighting module 300 is mounted. The control unit 302 is configured to communicate with the electrical system of the vehicle (e.g., other control units of the vehicle) via a CAN-bus (controller are network bus). For example, an operator of the vehicle may control the lighting state of the light-emitting devices by operating a control member in the vehicle which, via the CAN-bus and the main connection port 312, enables controlling of the light-emitting devices 310.

Although not shown in FIG. 3A, the lighting module 300 comprises a connection port. The control unit 302 is configured to receive a voltage status via the connection port. The control unit 302 is a generic control unit (an ECU) preconfigured for use in any one the locations (left or right) for head lights (or taillights) before it has been programmed to be in a certain mounting location.

Figure 3B:
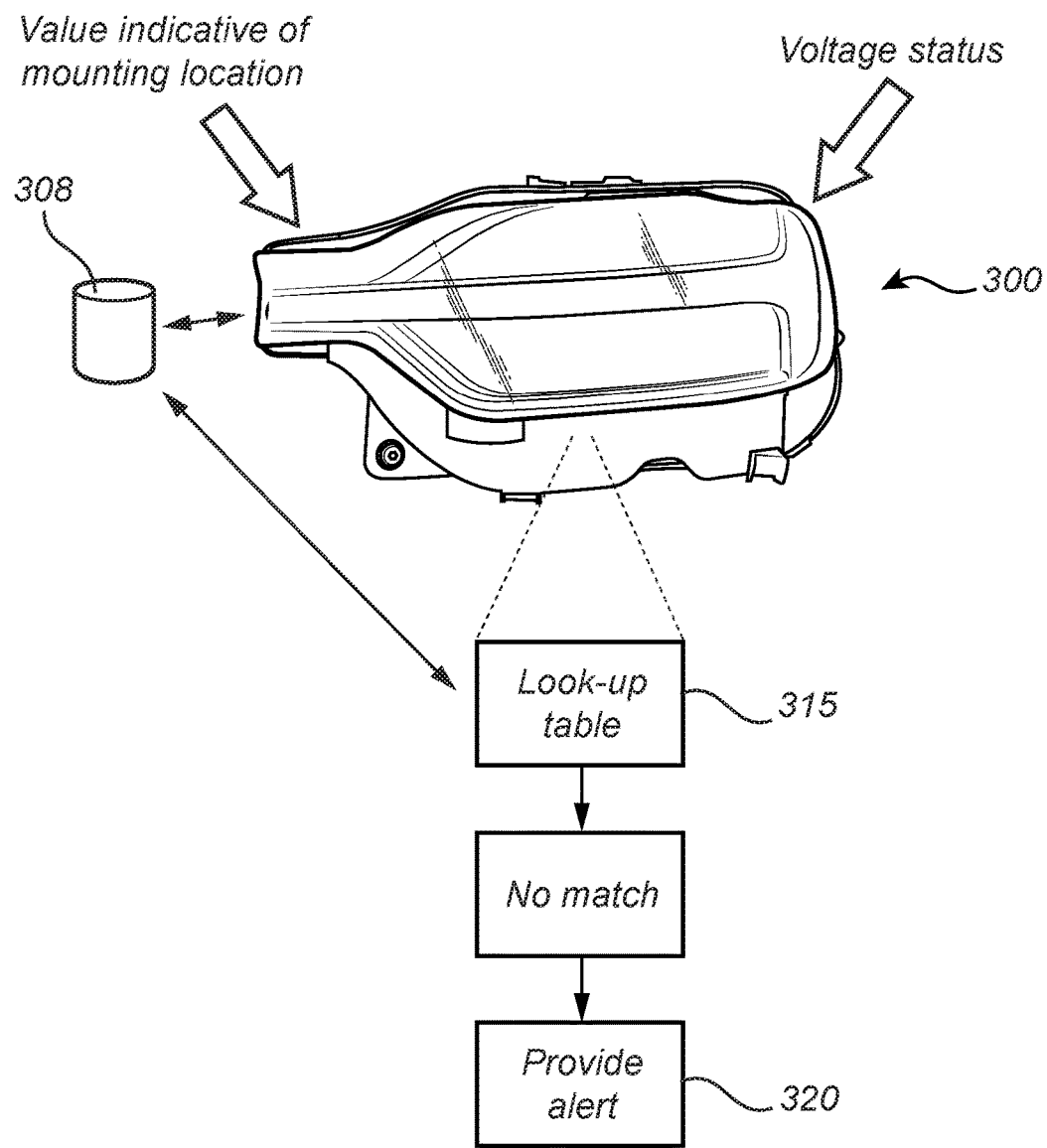
FIG. 3B conceptually illustrates configuring a lighting module.

Now with reference to FIG. 3B; the control unit in the presently exemplified embodiment in FIG. 3B receives, during a configuration step including programming of the control unit, a value indicative of an intended mounting location for the lighting module 300, i.e., in this case left side head light. The control unit 302 stores this value indicative of the mounting location for proper communication with a vehicle electrical system when it has been mounted in the vehicle. The value is stored in the storage device 308, here only conceptually illustrated. The storage device 308 is preferably arranged in the lighting module as part of the control unit. Furthermore, the control unit 302 receives a voltage status via the connection port (not shown). The voltage status is compared with a plurality of voltage statuses stored in a look-up table 315 in which each voltage status has an associated value indicative of a location in a vehicle. The look-up table 315 is stored on the storage device 308. If the location found in the look-up table based on the received voltage status, does not match the mounting location received during the configuration step, the control unit is configured to provide an alert 320 that it has been programmed for operation in the wrong location.

Figure 4:
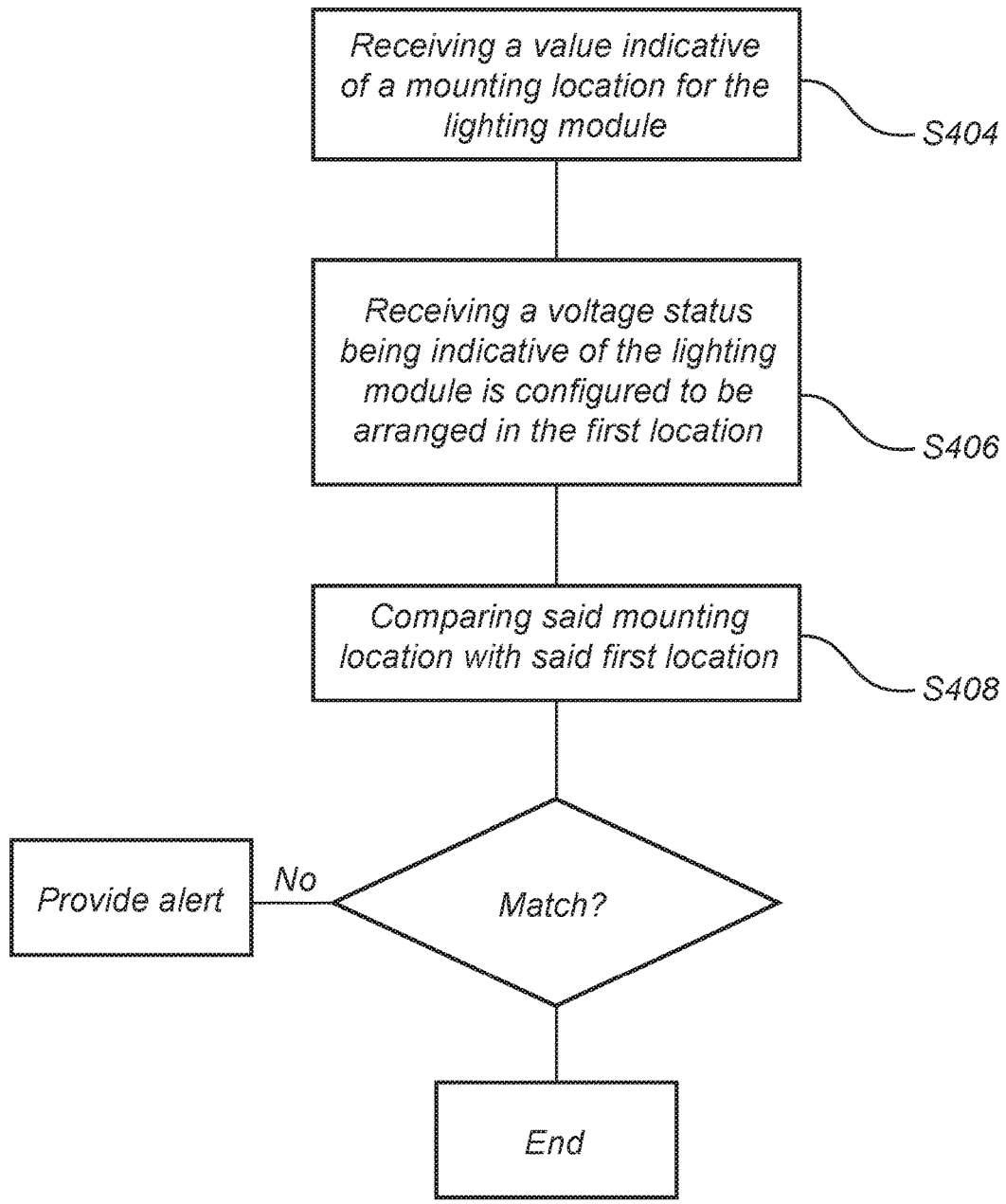
FIG. 4 is a flow-chart of method steps according to embodiments of the disclosure.

FIG. 4 is a flow-chart of method steps according to embodiments of the disclosure. The method is for configuring a lighting module for operating in a first location of at least two spatially separated locations of a vehicle, the lighting module comprising a light-emitting device and a control unit configured to control a lighting state of the lighting device. The control unit further comprises a connection port. In a first step (S404), the control unit receives a value indicative of an intended mounting location for the lighting module. This value may be received during a programming step of the control unit. Next (S406), the control unit receives a voltage status via the connection port, the voltage status being indicative of that the lighting module is configured to be arranged in the first location. The control unit compares (S408), the mounting location with the first location. When the mounting location and the first location does not match, the control unit provides an alert that it has been programmed for the wrong location. When the mounting location and the first location matches, the lighting module is operational in the mounting location, thus, no alert signal is provided.

The programming provides the control unit with information that it should be operable in a mounting location. The control unit also receives a voltage status, which provides the control unit with information that it is arranged in a lighting module being configured for the first location. In order to ensure proper operation for the control unit, the first location and the mounting location must match.

Figure 5:
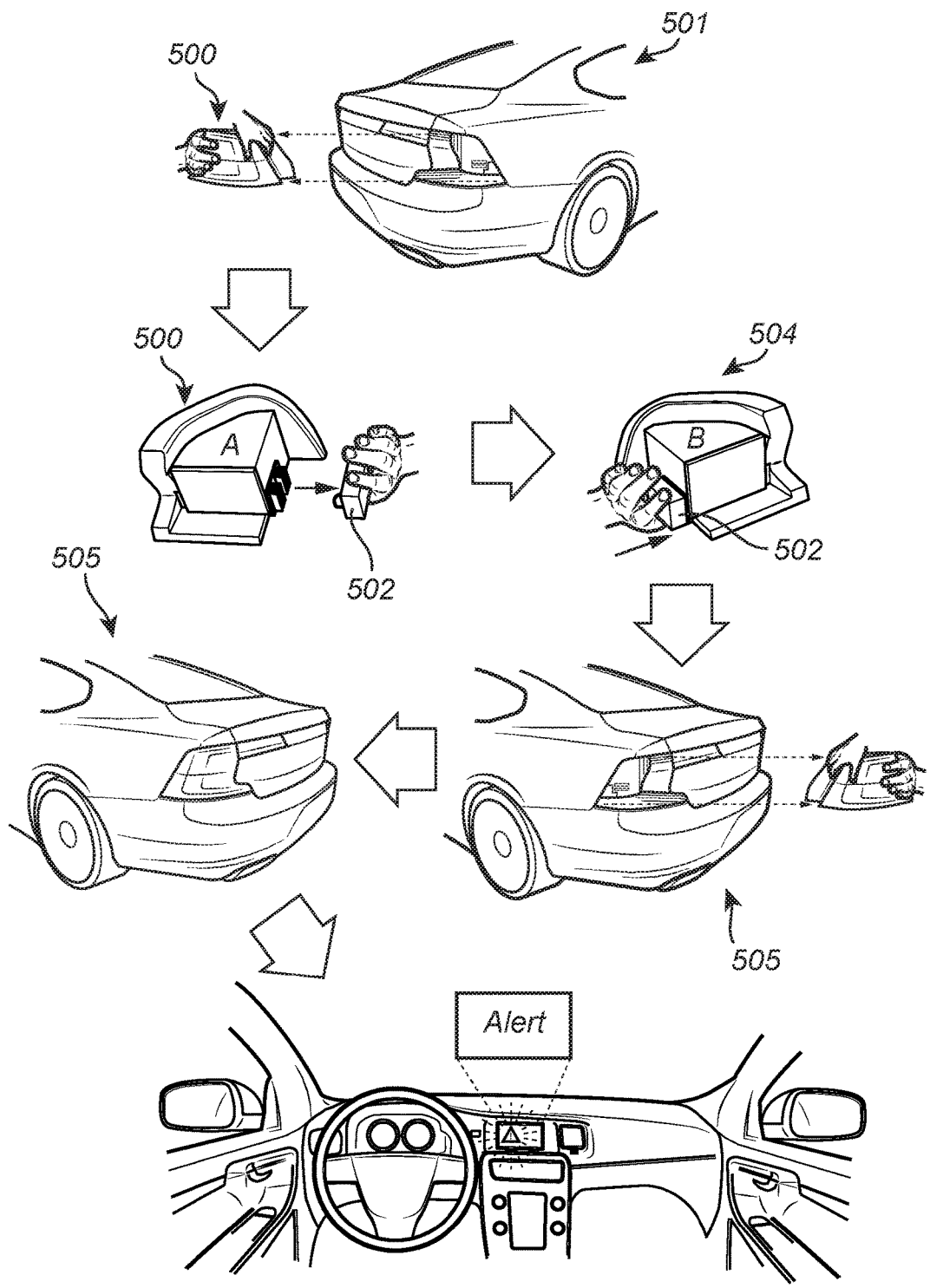
FIG. 5 conceptually illustrates mounting of a lighting module control unit in a wrong mounting location.

FIG. 5 conceptually illustrates a use case for embodiments of the disclosure. A lighting module 500 is here shown as a right side tail light module having been removed from a first vehicle 501. The control unit 502 of the lighting module 500 is removed from the lighting module 500. The control unit 502 has previously received a value indicative of the mounting location in the first vehicle 501. i.e., the control unit 502 has been programmed that it is mounted as a right side tail light module and has received a matching voltage status. The control unit 502 has therefore stored information indicating that it should be mounted as right side tail light module and will communicate with the electrical systems of a vehicle as if it is mounted as a right side tail light module.

The control unit 502 is now used as a spare part and is mounted in another tail light module 504 being a left side tail light module 504. When the left side tail light module 504 is mounted in second vehicle 505 and the control unit 502 is powered on, the control unit 502 receives voltage status via its connection pin from the present location in the other lighting module 504 being different from the first lighting module 500. However, the voltage status received in the lighting module 504 in the second vehicle, when the control unit 502 is now mounted in the left side tail light module 504, is indicative of that the control unit 502 is mounted in a left side tail lighting module, not on the right side as in the lighting module 500 in the first vehicle. Thus, the mounting locations indicated do not match. In this case, the control unit 502 provides an alert that it is mounted in the wrong location. The alert is here shown as a visual alert; however, this is only for illustrative purposes and the alert may likewise be provided as a sound signal, or an error code, or by any other suitable means.

As one skilled in the art would understand, the control units 202, 212, 302, and 502, vehicle control units, and any other system, subsystem, device or module described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A lighting module for a vehicle, the lighting module comprising:
    a light emitting device; and
    a control unit configured to control a lighting state of the light emitting device;
    wherein the lighting module is arrangeable in a first location of at least two spatially separated locations of the vehicle, the control unit of the lighting module comprises a connection port, and the control unit is configured to receive a passive voltage status via the connection port, the passive voltage status being indicative of that the lighting module is configured to be arranged in the first location.

2. The lighting module according to claim 1, wherein the control unit comprises a storage device, the control unit is pre-configured for use in any one of the at least two locations of the vehicle before the vehicle has stored a value indicative of an intended mounting location in the vehicle, and the control unit is configured to receive a value indicative of the mounting location, whereby the control unit is configured to store the value indicative of the mounting location in the storage device so that the control unit is operable in the mounting location.

3. The lighting module according to claim 2, wherein at least one passive voltage status and associated location value pair is stored on the storage device, and wherein the control unit is configured to:
    determine a value indicative of the first location based on the received passive voltage status and the stored at least one passive voltage status and associated location value pair,
    compare the value indicative of the mounting location with the value indicative of the first location, and
    provide an alert signal that the control unit is installed in a wrong location when the mounting location is determined to not match the first location.

4. The lighting module according to claim 3, wherein the storage device has stored a look-up table comprising a plurality of passive voltage status and associated location value pairs.

5. The lighting module according to claim 2, wherein when the control unit is transitioned from an at least partly in-active mode to an at least partly active mode, the control unit is configured to receive a further passive voltage status indicative of a present location where the control unit is installed,
    wherein the control unit is further configured to:
    compare the present location with the mounting location, and
    when the present location does not match the mounting location, provide an alert signal that the control unit is installed in a wrong location.

6. The lighting module according to claim 1 wherein the passive voltage status receivable via the connection port is one of a floating voltage, ground, or a reference voltage level.

7. A vehicle comprising the lighting module according to claim 1.

8. A lighting system comprising the lighting module according to claim 1, wherein the lighting module is a first lighting module and the control unit is a first control unit, the lighting system further comprising:
    a second lighting module including:
        a second lighting device; and
        a second control unit configured to control a lighting state of the second lighting device, wherein the second lighting module is arrangeable in a second location of the at least two locations of the vehicle;
    wherein the second control unit comprises a second connection port, the second control unit is configured to receive a passive voltage status via the second connection port, the passive voltage status being indicative of that the second lighting module is configured to be arranged in the second location.

9. The lighting system according to claim 8, wherein the passive voltage status receivable from the first connection port is a one of a floating voltage, ground, or a first reference voltage, and the passive voltage status receivable from the second connection port is another one of a floating voltage, ground, or a reference voltage different from the first reference voltage.

10. The lighting system according to any claim 8, wherein the first lighting module and the second module are head light modules for the vehicle.

11. The lighting system according to claim 8, wherein the first lighting module and the second lighting module are tail light modules for the vehicle.

12. The lighting system according to claim 8, wherein the first lighting module and the second lighting module each comprise a main connection port so that the first control unit and the second control unit can communicate with electronic circuitry of the vehicle.

13. A vehicle comprising the lighting system according to claim 8.

14. A method for configuring a lighting module for operating in a first location of at least two spatially separated locations of a vehicle, the lighting module including a light-emitting device, and a control unit configured to control a lighting state of the lighting device, wherein the control unit includes a connection port, the method comprising:
    receiving, by the control unit, a value indicative of a mounting location for the lighting module;
    receiving, by the control unit, a passive voltage status via the connection port, the passive voltage status being indicative of that the lighting module is configured to be arranged in the first location;
    comparing, by the control unit, the mounting location with the first location; and providing an alert signal that the control unit is installed in a wrong location when the mounting location and the first location are determined to not match.

15. The method according to claim 14, comprising:
when the control unit is transitioned from an at least partly in-active mode to an at least partly active mode and the control unit has stored a value indicative of the mounting location,
receiving, by the control unit, a further passive voltage status indicative of a present location where the control unit is installed,
comparing, by the control unit, the present location with the mounting location, and
when the present location does not match the mounting location, providing an alert signal that the control unit is installed in the wrong location.

16. The method according to claim 14, wherein when the lighting module is mounted in the first location in the vehicle, and having received a passive voltage status indicative of a mounting location which matches the first location:
initiating communication, by the control unit, with a node address within electronic circuitry of the vehicle, the node address being associated with the mounting location.

17. A lighting module for a vehicle, the lighting module comprising:
a light emitting device; and
a control unit configured to control a lighting state of the light emitting device;
wherein the lighting module is arrangeable in a first location of at least two spatially separated locations of the vehicle, the control unit of the lighting module comprises a connection port, and the control unit is configured to receive a voltage status via the connection port, the voltage status being indicative of that the lighting module is configured to be arranged in the first location;
wherein the control unit comprises a storage device, the control unit is pre-configured for use in any one of the at least two locations of the vehicle before the vehicle has stored a value indicative of an intended mounting location in the vehicle, and the control unit is configured to receive a value indicative of the mounting location, whereby the control unit is configured to store the value indicative of the mounting location in the storage device so that the control unit is operable in the mounting location;
wherein when the control unit is transitioned from an at least partly in-active mode to an at least partly active mode, the control unit is configured to receive a further voltage status indicative of a present location where the control unit is installed, wherein the control unit is further configured to compare the present location with the mounting location, and when the present location does not match the mounting location, provide an alert signal that the control unit is installed in a wrong location.

18. The lighting module according to claim 17 wherein the voltage status receivable via the connection port is one of a floating voltage, ground, or a reference voltage level.

19. A lighting system comprising the lighting module according to claim 17, wherein the lighting module is a first lighting module and the control unit is a first control unit, the lighting system further comprising:
a second lighting module including:
a second lighting device; and
a second control unit configured to control a lighting state of the second lighting device, wherein the second lighting module is arrangeable in a second location of the at least two locations of the vehicle;
wherein the second control unit comprises a second connection port, the second control unit is configured to receive a voltage status via the second connection port, the voltage status being indicative of that the second lighting module is configured to be arranged in the second location.

20. A vehicle comprising the lighting module according to claim 17.

* * * * *